(12) United States Patent
Segler, Jr. et al.

(10) Patent No.: US 6,709,113 B2
(45) Date of Patent: Mar. 23, 2004

(54) REDUCTION OF MOIRE EFFECT IN PIXELATED REAR-PROJECTION DISPLAYS

(75) Inventors: Dana J. Segler, Jr., Allen, TX (US); Adam J. Kunzman, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/186,412

(22) Filed: Jul. 1, 2002

(65) Prior Publication Data

US 2003/0002017 A1 Jan. 2, 2003

Related U.S. Application Data

(60) Provisional application No. 60/301,987, filed on Jun. 30, 2001.

(51) Int. Cl.$^7$ .......................... G03B 21/00; G03B 21/60
(52) U.S. Cl. .......................... 353/69; 353/74; 359/455
(58) Field of Search .......................... 353/69, 70, 74, 353/32; 359/455–456, 460; 348/744

(56) References Cited

U.S. PATENT DOCUMENTS

| | | | | | |
|---|---|---|---|---|---|
| 5,448,401 A | * | 9/1995 | Takuma et al. | ............. | 359/456 |
| 5,615,045 A | * | 3/1997 | Takuma et al. | ............. | 359/456 |
| 5,768,014 A | * | 6/1998 | Lee | ............. | 359/457 |
| 5,877,893 A | * | 3/1999 | Kim | ............. | 359/456 |
| 6,307,675 B1 | * | 10/2001 | Abe et al. | ............. | 359/457 |
| 6,474,819 B2 | * | 11/2002 | Yoder et al. | ............. | 353/98 |

* cited by examiner

Primary Examiner—Russell Adams
Assistant Examiner—Michael Dalakis
(74) Attorney, Agent, or Firm—Charles A. Brill; Wade James Brady, III; Frederick J. Telecky, Jr.

(57) ABSTRACT

An apparatus and method for reducing the moiré effect in rear-projection displays by rotating the dark-stripe structure (711, 712) in the screen (71) 45±15 degrees relative to the displayed pixel structure. By rotating the dark-stripes (711) relative to the displayed pixels, the spatial frequency at which the moiré effect sets in can be improved by 15% to 41%.

40 Claims, 4 Drawing Sheets

REDUCTION OF MOIRE EFFECT IN PIXELATED REAR-PROJECTION DISPLAYS

This application claims priority under 35 USC §119(e)(1) of provisional application No. 60/301,987 filed Jun. 30, 2001.

FIELD OF THE INVENTION

The present invention relates to projection displays and more specifically to reducing the moiré effect associated with rear-projection displays based on pixelated technologies, such as DMD, LCD, LCOS, etc.

BACKGROUND OF THE INVENTION

The typical screen technology in rear projection displays utilizes a special dark-stripe structure to improve the ambient light rejection, which effectively provides a higher contrast display. This dark-stripe structure is simply an array of blackened vertical stripes, separated by regions allowing light to pass through. These regions allowing light to pass through, whether they may be transparent, translucent, diffuse, or another type of structure, will be referred to herein as clear stripes or simply stripes or structures allowing light to pass. For CRT based displays these screens work fine. However for pixelated (digital) displays, which utilize digital spatial light modulators (SLM) such as the micromirror device (DMD) or LCD technology, the current dark-stripe structure can interfere optically with the pixelated structure of the SLMs, causing interference fringes known as moiré patterns.

Figure 1A:
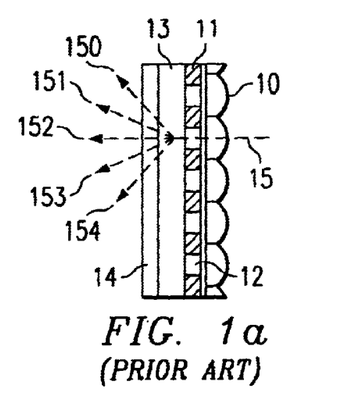
FIGS. 1a and 1b are drawings showing the top and front views of a conventional dark-stripe rear-projection display screen.
Figure 1B:
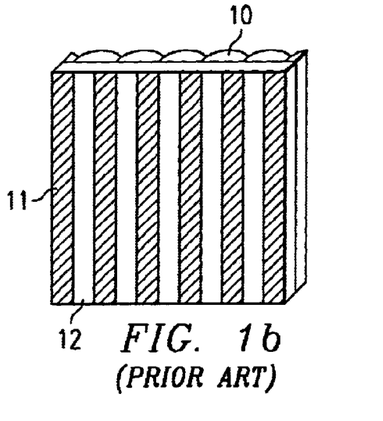

FIGS. 1a and 1b are top and front drawings, respectively, of a typical dark-stripe, or dark-stripe rear-projection screen. The backside of the screen, where the projected image enters, consists of a layer of small lenticular lens elements 10. The dark-stripe structure is fabricated on the opposite surface (from the lens elements) of the lenticular layer and consists of vertical black stripes 11 separated by transparent (clear) stripes 12. Next, a diffusion layer 13 is put on top of the dark-stripe layer to diffuse the light 15, coming through the transparent stripes 12, across the entire screen 150–154. Finally a hard coating layer 14 is applied on the outside surface of the screen for protection purposes.

In operation, the black stripes 11 tend to make the screen look dark to the viewer while still letting light pass through it. This provides adequate picture contrast for viewing in a room with ordinary lighting conditions (although not intended for use in direct sunlight).

In these display screens, the lenticular lens elements 10 are optimized to direct most of the available light to a viewing spot directly in front of the screen, where a typical viewer is likely to be located. As the viewer moves away from this central viewing point, either vertically or horizontally, the brightness will gradually decrease.

Figure 2A:
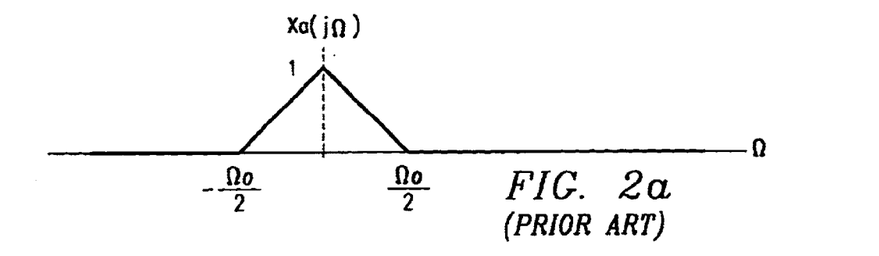
FIG. 2a is a waveform for a Fourier transform of a continuous-time signal.
Figure 2B:
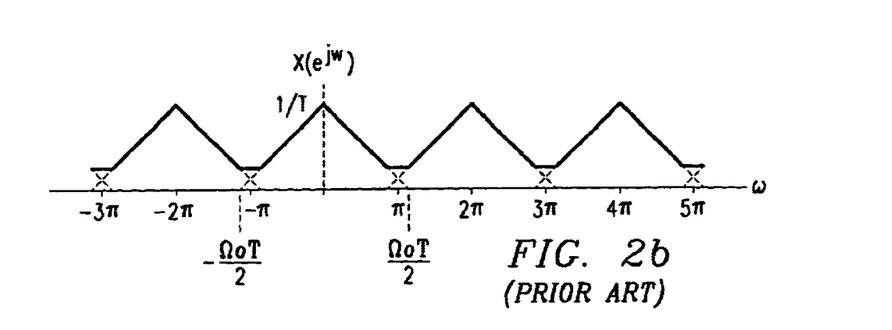
FIG. 2b is a waveform for a Fourier transform of a discrete-time signal obtained by periodic sampling the continuous waveform of FIG. 2a, for the case where the sampling period is large so that the periodic repetitions of the continuous-time transform overlap, resulting in a moiré fringes.
Figure 2C:
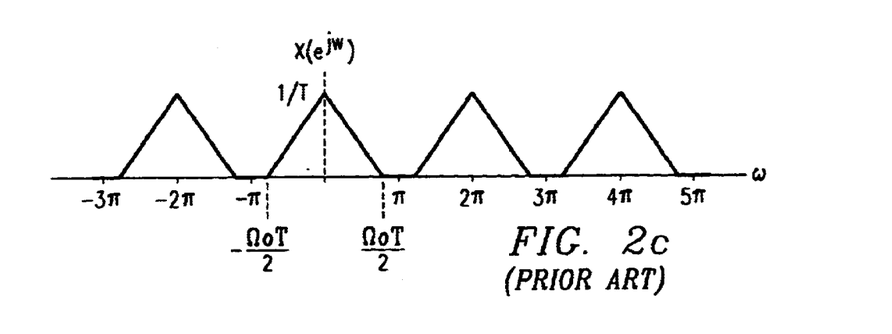
FIG. 2c is a waveform for a Fourier transform of a discrete-time signal obtained by periodic sampling the continuous waveform of FIG. 2a for the case where the sampling period is small enough that the periodic repetitions of the continuous-time transform do not overlap and therefore do not cause moiré fringes to occur.

FIG. 2a is a Fourier transform of a continuous-time signal and FIGS. 2a and 2b are Fourier transforms of discrete-time signals obtained by periodic sampling this continuous signal, which illustrate what causes the moiré fringes in digital displays. In FIG. 2b the sampling period for the screen is large (low sampling rate), so that the periodic repetitions of the continuous-time transform (FIG. 2a) overlap. In this case, the upper frequencies in Xa(jΩ) (FIG. 2a) get reflected into the lower frequencies in $X(e^{j\omega})$ (FIG. 2b) in the overlapped areas. This phenomenon, where in effect the high frequency component in the continuous time signal takes on the identity of a lower frequency, is called aliasing and causes moiré fringes to occur. On the other hand, in FIG. 2c the sampling period for the screen is small enough (high sampling rate) so that the periodic repetitions of the continuous time transform do not overlap and therefore moiré fringes do not occur.

Figure 3:
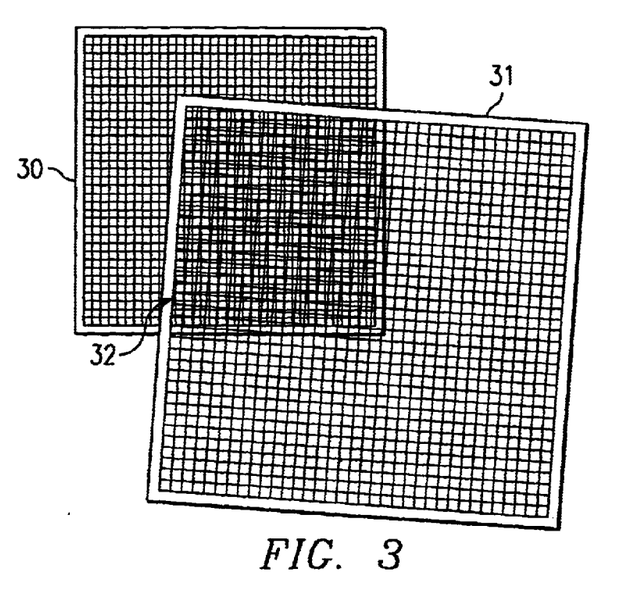
FIG. 3 is a sketch illustrating the moiré effect where one pixelated pattern is laid over a second pixelated pattern and slightly rotated to generate the moiré fringe pattern.

FIG. 3 is an example of the moiré effect 32. This illustration involves overlaying one pixelated pattern 31 over a second pixelated pattern 30 and slightly rotating the patterns relative to each other to establish the overlapping conditions discussed in FIG. 2b.

The pitch (spacing between lines) of dark-stripe screens is continuously getting smaller as screen technology advances, but so are the display pixels, so that moiré effects will continue to be a problem. What is needed is a method to provide a step-function improvement to overcome this problem. The disclosed invention accomplishes this by rotating the dark-stripe structure relative to the displayed pixels.

SUMMARY OF THE INVENTION

This invention discloses a method for reducing the moiré effect in rear-projection displays by rotating the dark-stripe structure in the screen 45±15 degrees relative to the vertical axis of the display. By rotating the black stripes relative to the display pixels, the spatial frequency at which the moiré effect sets in can be improved by 15% to 41%.

To prevent the moiré phenomenon from occurring, the Nyquist rate of the screen structure must be less than one-half the pixel rate (as imaged on the screen); that is, the projected pixel pitch is greater than twice the screen structure pitch. The method of this invention extends the ratio of the projected pixel pitch to screen structure pitch by a factor of up to 1.41.

The lenticular lens elements on the input surface of the screen can be shaped to match the angle of the opening between dark-stripes to maintain a high brightness level in the center of the screen that decreases in the normal sense as the viewer moves in either the vertical or horizontal directions, if desired.

This method extends the use of existing lower-cost dark-stripe screens to provide high performance displays with reduced moiré interference and as screen technology advances with finer dark-stripe pitch, will continue to provide between 15% and 41% improvement over conventional vertical stripe screens.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

This invention discloses a method for reducing the moiré effect in rear-projection displays by rotating the dark-stripe structure in the screen 45±15 degrees relative to the displayed pixels or the axes of the display. By rotating the dark-stripes relative to the displayed pixels, the spatial frequency at which the moiré effect sets in can be improved by 15% to 41%.

Figure 4A:
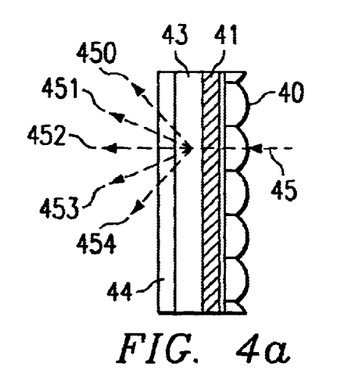
FIGS. 4a and 4b are drawings showing the top and front views of the dark-stripe rear-projection screen of the present invention, where the dark-stripe structure is rotated 45±15 degrees relative to the pixels being displayed on the screen.
Figure 4B:
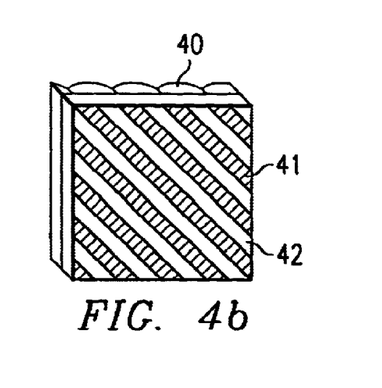

FIGS. 4a and 4b are drawings showing the top and front views of the dark-stripe rear-projection screen of the present invention, where the dark-stripe structure is rotated 45±15 degrees relative to the axes of the screen. The backside of the screen where the projected image enters, consists of a layer of small lenticular lens elements 40. The dark-stripe structure is fabricated on the opposite surface (from the lens elements) of the lenticular layer and consists of diagonal black stripes 41 separated by transparent (clear) stripes 42. However, in this case the dark-stripe structure is rotated from 45±15 degrees relative to the vertical axis of the screen. Next, a diffusion layer 43 is fabricated on top of the rotated dark-stripe layer to diffuse the light 45, coming through the transparent stripes 42, across the entire screen 450–454. Finally a hard coating layer 44 is applied on the outside surface of the screen for protection purposes.

In operation, the rotated black stripes 41 tend to make the screen look dark to the viewer while still letting light pass through it. This provides adequate picture contrast for viewing in a room having ordinary lighting conditions.

In these display screens the lenticular lens elements 40 are optimized to direct most of the available light to a viewing spot directly in front of the screen, where a typical viewer is likely to be located. However, in this case the maximum roll-off in brightness will occur as the viewer moves away from this central viewing point in a diagonally manner. Although this has proven to be acceptable, the lenticular lens elements can be shaped to cause the maximum brightness roll-off to occur in the vertical and horizontal directions, if desired.

To prevent moiré patterns from occurring in dark-stripe rear-projection screens the conditions stated in the following equation must exist:

Projected Pixel Pitch≧2× Screen Structure Pitch, where screen structure pitch is defined as the distance between black stripes on the screen and projected pixel pitch as the distance between the projector's pixels as imaged on the screen.

Another way of saying this is that since the screen pitch must be ≦one-half the projected pixel pitch, then the sampling rate (1/pitch) of the screen, generally referred to as the Nyquist rate, must be ≧2 the projected pixel rate.

Figure 5A:
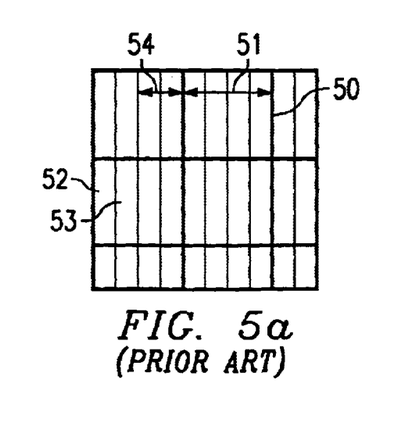
FIGS. 5a and 5b are drawings illustrating the pixel pitch vs. screen structure pitch for a conventional dark-stripe screen and the rotated dark-stripe screen of the present invention, respectively.
Figure 5B:
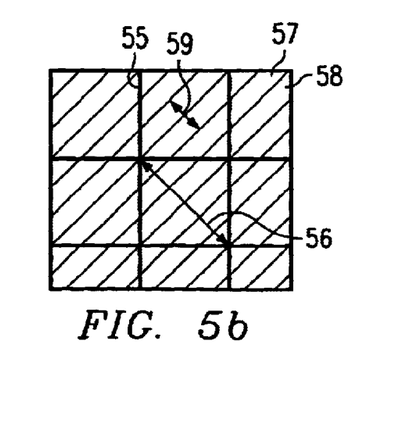

FIGS. 5a and 5b are drawings illustrating the projected pixel pitch vs. screen structure pitch for a conventional dark-stripe screen and the rotated dark-stripe screen of the present invention, respectively. In FIG. 5a, the projector's pixels are defined by the dark lines 50, while the screen's dark-stripe structure is shown by the shaded/white columns 52/53. In this drawing, the projected pixel pitch 51 is 2 times the dark-stripe pitch 54; e.g., the projected pixel pitch 51 may be 1 mm and the dark-stripe pitch 54 0.5 mm. Therefore, the screen sampling rate is 2 times the pixel sampling rate, thereby just satisfying the Nyquist rate so that moiré patterns would not be introduced. However, since the pixel pitch of many newer Spatial Light Modulators is being reduced, the impact of moiré using the same dark-stripe screen may increase and become objectionable. As the screen's dark-stripe structure is made finer as in the case of future more expensive screens, there is greater margin before the Nyquist rate is exceeded and moiré effects become evident.

However, as shown in FIG. 5b the Nyquist rate can be improved for the same black-strip screen of FIG. 5a by rotating the dark-stripe structure relative to the displayed pixels. In this example, the pixels are defined by the dark lines 55 and the dark-stripe structure by diagonal shaded/white stripes 57/58, which is rotated 45° relative to the pixels. The dark-stripe pitch 59 is the same (0.5 mm) as in the earlier example, but the pixel pitch 56 is now 1.4 mm, or 41% greater than for the vertical stripe example. The means that a given screen has up to a 41% greater margin against moiré effects, for the rotated dark-stripe structure of the present invention, over the conventional vertical dark-stripe structure.

Figure 5C:
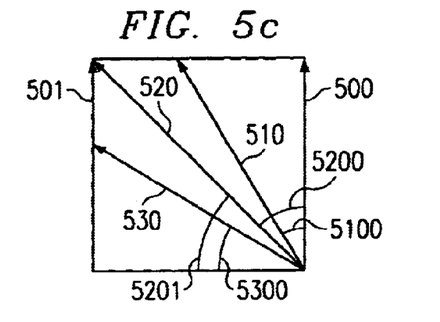
FIG. 5c is a graph illustrating the trigonometric improvement in pixel pitch to dark-stripe pitch realized by rotating the dark-stripe structure in the method of the present invention.

FIG. 5c is a graph showing the trigonometric relationship realized by rotating the dark-stripe structure in a rear-projection screen. In this graph, the length of lines 500, 501 represents the pixel pitch for a conventional vertical dark-stripe screen, while the length of lines 510, 520, and 530 represent the effective pixel pitch for the rotated dark-stripe screen of the present invention, where the structure is rotated 30° 5100 and 45° 5200 relative to the vertical axis or 30° 5300 and 45° 5201 relative to the horizontal axis. Normalizing the length of these vectors so that lines 500, 501 for a conventional screen is 1.0, then the length of lines 510, 520, and 530 for the rotated dark-stripe structure of the present invention are 1.15, 1.41, and 1.15, respectively. This represents a maximum improvement in the Nyquist rate of 41% when the dark-stripe structure 57 is rotated 45° and 15% when rotated 30° relative to either the vertical or the horizontal axis of the screen.

The trigonometric functions to establish this improvement is given as follows:

For rotations of 30 to 45 degrees from the vertical axis of the screen, cosine $(\theta) = L_{(500)}/L_{(\theta)}$, so that for
$L_{(500)} = 1$ and angle $(\mathbf{5100}) = 30°$, then
$L_{(510)} = L_{(500)}/\text{cosine } (30°) = 1.0/0.866$
$L_{(510)} = 1.155$, or for
$L_{(500)} = 1$ and angle $(\mathbf{5200}) = 45°$, then
$L_{(520)} = L_{(500)}/\text{cosine } (45°) = 1.0/0.707$
$L_{(520)} = 1.414$; and for rotations of 30 to 45 degrees from the horizontal axis of the screen,
cosine $(\theta) = L_{(501)}/L_{(\theta)}$, so that for
$L_{(501)} = 1$ and angle $(\mathbf{5300}) = 30°$, then
$L_{(530)} = L_{(501)}/\text{cosine } (30°) = 1.0/0.866$
$L_{(530)} = 1.155$, or for
$L_{(501)} = 1$ and angle $(\mathbf{5201}) = 45°$, then
$L_{(520)} = L_{(501)}/\text{cosine } (45°) = 1.0/0.707$
$L_{(520)} = 1.414$.

Figure 6A:
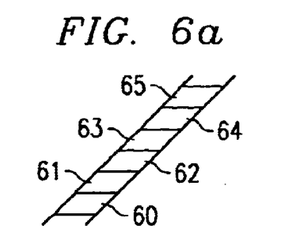
FIGS. 6a and 6b show lenticular lens elements for the rotated dark-stripe screen of the present invention, where the lens elements are shaped to reduce the brightness roll-off along the horizontal screen axis.
Figure 6B:
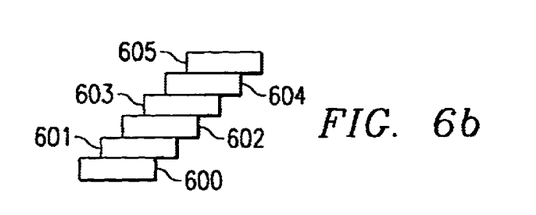

The lenticular lenses tend to project a majority of the available light directly in front of the center portion of the screen where the viewer's eye is normally located. As the viewer moves about, the screen brightness is observed to roll-off. For the rotated dark-stripe structure of the present invention, this roll-off will be more pronounced along the diagonals from corner-to-corner of the screen. Although this diagonal roll-off is no more objectionable than the vertical and horizontal roll-off in conventional screens, the optimization of the vertical and horizontal components is no longer preserved to maintain the original viewing angles. The lenticular lens elements 60–65 and 600–605 shown in FIGS. 6a and 6b can be shaped to maintain the traditional brightness roll-off relative to the vertical and horizontal screen axes.

Figure 7:
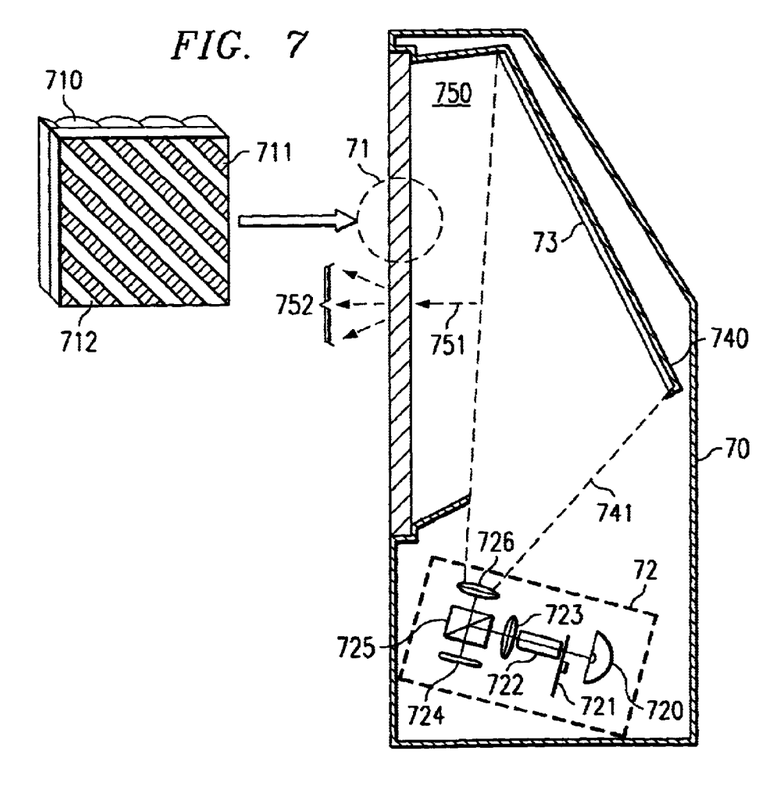
FIG. 7 is a drawing of a rear-projection display, which uses the rotated black-strip display screen of the present invention.

FIG. 7 is a drawing of a rear-screen projection display, which uses the rotated dark-stripe screen of the present invention. The projector is housed in a free-standing cabinet 70 and includes a projection engine 72, a relative large turning mirror 73, and the rotated black-strip rear-projection screen 71 of the present invention. The engine 72 can use any pixelated technology, such as a digital micromirror device (DMD), liquid crystal display (LCD), or other spatial light modulator (SLM). The engine 72 is located in the lower portion of the cabinet 70 and uses a single SLM 724 to modulate the light. This particular configuration of the engine 720 is comprised of a light source 720, which emits white light along a first light path, through a motor-driven rotating color filter wheel 721, which provides sequential red-green-blue (R-G-B) light. This sequential light is collected by an integrating rod 722 and passed through a condensing lens 723 where it is sized to fit the aperture of a total-internal-reflective (TLR) prism 725. The light is reflected off an internal surface of the TIR prism on to the reflective mirrors of the SLM 724 where it is modulated and projected back through the TIR prism 725 along a second light path, through a projection lens 726 and projected 741 (shaded area) on to the rather large turning mirror 73 positioned diagonally along the upper back surface of the cabinet 70, as shown. This sequential R-G-B light is then reflected 751 (shaded area) off the turning mirror 73 through the rotated dark-stripe screen 71 for viewing by an observer. This shows one configuration of one type engine that can be used with the screen of the present invention. Other SLM engines may not involve a TIR prism and/or an integrating rod. Other projectors use two or three spatial light modulators.

Typical pixel pitch at the screen for a projected image in a DMD rear-projection system is about 1.0 mm based on the projection lens 726 having a magnification of 72× and a 57-inch diagonal image with 16:9 aspect ratio. This corresponds to an effective pitch of 1.4 mm for the rotated dark-stripe screen of the present invention. The margin against moiré fringes will become more critical as the pixels become smaller relative to the black stripe pitch in future projection systems.

The dark-stripe rear-projection screen 71 is that of the present invention, where the dark-stripe structure is rotated 45±15 degrees relative to the displayed pixels and/or the axes of the screen. The backside of the screen, where the projected image enters, consists of a layer of small lenticular lens elements 710. The dark-stripe structure is fabricated on the opposite surface (from the lens elements) of the lenticular layer and consists of diagonal black stripes 711 separated by transparent (clear) stripes 712. In this case the dark-stripe structure is rotated 45±15 degrees relative to the displayed pixels. Next, a diffusion layer (not shown) is fabricated on top of the rotated dark-stripe layer to diffuse 752 the light 751, coming through the transparent stripes 712, across the entire screen. Finally a hard coating layer is applied on the outside surface of the screen for protection purposes.

In operation, the projector presents sequential R-G-B images to the screen 71 at a rate sufficient that the eye integrates the image to provide a high-performance color picture. The rotated black stripes 711 tend to make the screen look dark to the viewer while still letting light pass through it. This provides adequate picture contrast for viewing in a room with ordinary lighting conditions.

Where desirable, the lenticular lens elements can be shaped to cause the brightness roll-off in the screen to occur in the vertical and horizontal directions. This screen 71 improves the margin for preventing moiré patterns from occurring by effectively increasing the pixel pitch to screen structure pitch ratio by a factor of up to 1.41.

Figure 8:
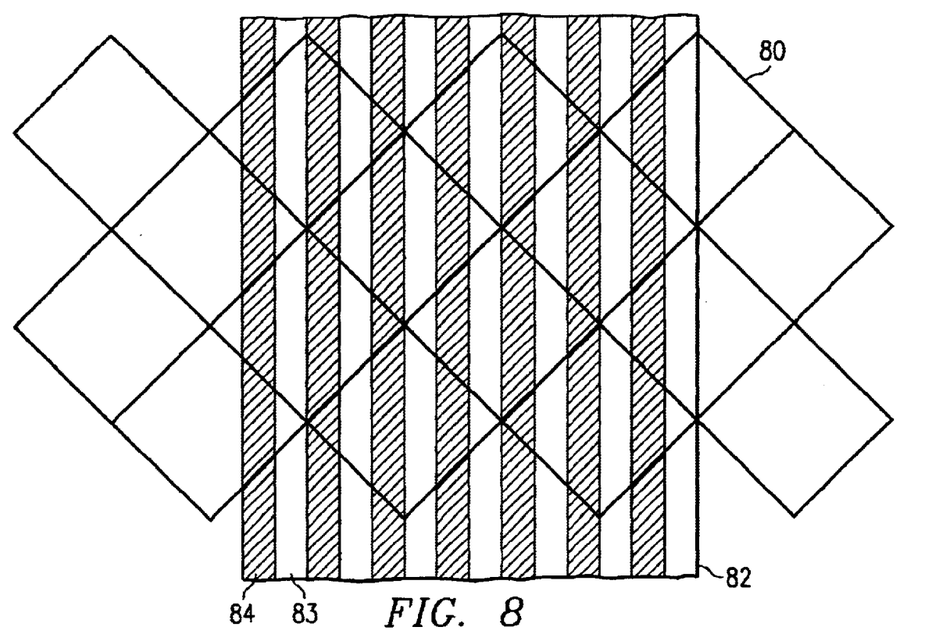
FIG. 8 illustrates the pixel pitch vs. screen structure pitch for a conventional dark-stripe screen combined with an image produced by an array of diamond-shaped pixels.
Figure 9:
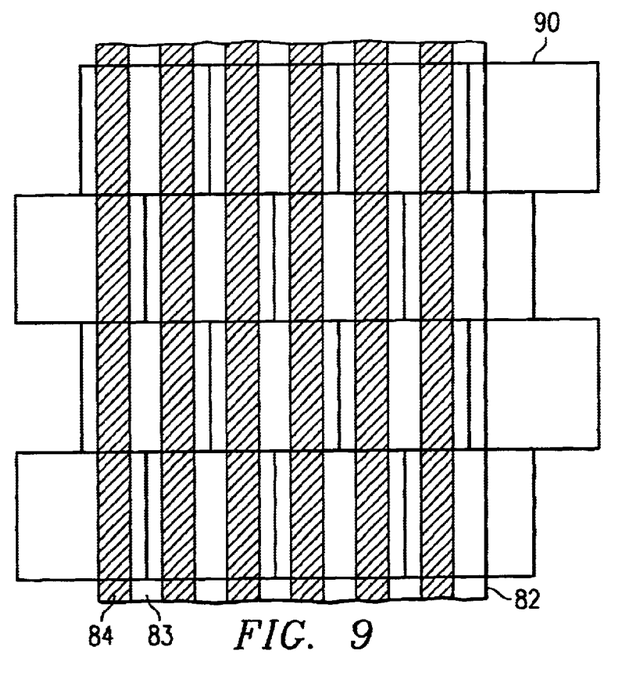
FIG. 9 illustrates the pixel pitch vs. screen structure pitch for a conventional dark-stripe screen combined with an image produced by a staggered pixel array.

While the present invention has thus far been discussed in terms of the preferred method of aligning the dark stripe structures of the display screen diagonally across a pixelated image formed by vertical columns and horizontal rows of pixels, it should be understood that an alternate embodiment provides vertical or horizontal-from the viewer's perspective-dark stripe structures to prevent or reduce the moiré effect when an image formed by a staggered array of pixels is projected. FIGS. 8 and 9 show such arrangements.

In FIG. 8, an array of diamond-shaped pixels 80 is provided. The diamond-shaped pixels 80 are arranged in an array such that each pixel is offset in the horizontal direction from the pixels in the rows immediately above and below. A portion of the display screen 82 is superimposed on the array of diamond-shaped pixels 80. As in prior embodiments, the display screen is comprised of alternating clear 83 and dark 84 stripe structures arranged at a rate of at least twice the horizontal pixel resolution. As in the previous embodiments, diagonal relationship between the dark screen structures 84 and the diagonal pixels tends to reduce the moiré effect. While the embodiment of FIG. 8 reduces the moiré effect, the diagonal pixels often produce noticeable jagged edges on vertical lines and therefore are often less desirable than the typical orthogonal array of pixels shown in FIGS. 5a and 5b.

In FIG. 9, a staggered array of pixels is used. The staggered array of pixels 90 is comprised of rows of rectangular pixels, each row offset in the horizontal direction from the rows immediately above and below. A portion of the display screen 92 is superimposed on the array of diamond-shaped pixels 90. As in prior embodiments, the display screen is comprised of alternating clear 93 and dark 94 stripe structures arranged at a rate of at least twice the horizontal pixel resolution. As in the previous embodiments, diagonal relationship between the dark screen structures 94 and the diagonal pixels tends to reduce the moiré effect. While the embodiment of FIG. 9 reduces the moiré effect, the diagonal pixels often produce noticeable jagged edges on vertical lines and therefore are often less desirable than the typical orthogonal array of pixels shown in FIGS. 5a and 5b.

The embodiments shown in FIGS. 8 and 9 each provide pixel arrays with strong diagonal orientations. These pixel arrays form diagonal groups of pixels having abutting sides-in contrast with traditional orthogonal arrays in which diagonal pixels merely touch at the corners. By orienting the dark-structures of the display screen at an angle of 45±15 degrees relative to the diagonal groups of pixels having abutting sides the moiré effect is reduced.

While the present invention has been described in the context of preferred embodiments, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. The method of projecting an image, the method comprising:
   providing an image projector for projecting an image bearing beam of light along an image path; and
   providing a display screen on said image path such that said image beating beam forms an image comprised of a plurality of rows of pixels when said image bearing beam strikes said display screen, said display screen having a plurality of light impeding stripe structures in a single layer, oriented 45±15 degrees relative to said rows of pixels in said image.

2. The method of claim 1, wherein said providing an image projector comprises providing an image projector projecting an image bearing beam of light forming an image comprised of an orthogonal array of pixels arranged in rows and columns.

3. A rear-projection display screen comprising:
   a lenticular lens layer having shaped lens elements for receiving modulated light;
   a single dark-stripe layer attached to said lenticular lens layer, said dark-snipe layer comprising a plurality of dark-stripes separated by snipes allowing said modulated light to pass through said dark-stripe layer, said dark-stripes rotated 45±15 degrees relative to an edge of said screen.

4. The display screen of claim 3 comprising:
   a diffusion layer attached to said dark-stripe layer.

5. The display screen of claim 3 comprising:
   a diffusion layer attached to said dark-stripe layer; and
   a hard coating applied to said diffusion layer to protect said screen.

6. The display screen of claim 3, wherein said shaped lens elements are orientated to optimize the brightness and viewing angle of said screen in the vertical and horizontal, directions.

7. The display screen of claim 3, wherein said shaped lens elements are orientated to increase the viewing angle of said screen in the horizontal direction.

8. The display screen of claim 3, wherein said shaped lens elements are staggered to follow the orientation of said stripes allowing said modulated light to pass through.

9. A display, comprising:
   a projection engine projecting an image bearing beam of light along a light path, said image borne by said image beating beam of light comprised of a plurality of rows of pixels;
   a display screen positioned to receive said image bearing beam of light, said screen having a single-layer dark-stripe layer, said dark-stripe layer rotated 45±15 degrees relative to said rows of pixels.

10. The display of claim 9 comprising:
    a cabinet attached to said display screen to enclose said projection engine.

11. The display of claim 9 comprising:
    a fold mirror on said light path.

12. The display of claim 9, said display screen comprising:
    a lenticular lens layer having shaped lens elements for receiving modulated light;
    said dark-snipe layer attached to said lenticular lens layer, said dark-stripe layer comprising a plurality of dark-stripes separated by stripes allowing said modulated light to pass through said dark-stripe layer, said dark-stripes rotated 45±15 degrees relative to an edge of said screen.

13. The display of claim 12 comprising:
    a diffusion layer attached to said dark-stripe layer.

14. The display of claim 12 comprising:
    a diffusion layer attached to said dark-stripe layer opposite said lenticular lens layer.

15. The display of claim 12 comprising:
    a diffusion layer attached to said dark-stripe layer; and
    a hard coating applied to said diffusion layer to protect said screen.

16. The display of claim 12, wherein said shaped lens elements are orientated to optimize the brightness and viewing angle of said screen in the vertical and horizontal directions.

17. The display of claim 12, wherein said shaped lens elements are orientated to increase the viewing angle of &aid screen in the horizontal direction.

18. The display of claim 12, wherein said shaped lens elements are staggered to follow the orientation of said stripes allowing said modulated light to pass through.

19. The display of claim 9, said projection engine comprising at least one liquid crystal device.

20. The display of claim 9, said projection engine comprising at least one digital micromirror device.

21. The display of claim 9, said projection engine comprising:
    a light source emitting white light;
    a rotating color filter wheel filtering said white light and emitting sequential red-green-blue light; and
    a digital micromirror device modulating said sequential red-green-blue light.

22. The display of claim 9, said projection engine comprising:
    a light source emitting white light along a light path;
    an integrating rod along said light path;
    a rotating color filter wheel filtering said white light and emitting sequential red-green-blue light;
    a digital micromirror device modulating said sequential red-green-blue light;
    a total internal reflective prism on said light path directing said sequential red-green-blue light onto and off of said digital micromirror device.

23. A display, comprising:
    a projection engine projecting an image bearing beam of light along a light path, said image borne by said image bearing beam of light comprised of a plurality of diagonal groups of pixels having abutting sides;

a display screen positioned to receive said image hearing beam of light, said screen having a dark-stripe layer rotated 45±15 degrees relative to amid diagonal groups of pixels having abutting sides.

24. The display of claim 23 comprising:

a cabinet attached to said display screen to enclose said projection engine.

25. The display of claim 23 comprising:

a fold mirror on said light path.

26. The display of claim 23, said display screen comprising:

a lenticular lens layer having shaped lens elements for receiving modulated light;

said dark-stripe layer attached to said lenticular lens layer, said dark-stripe layer comprising a plurality of dark-stripes separated by stripes allowing said modulated light to pass through said dark-stripe layer, said dark-stripes rotated 45±15 degrees relative to an edge of said screen.

27. The display of claim 26 comprising:

a diffusion layer attached to said dark-stripe layer.

28. The display of claim 26 comprising:

a diffusion layer attached to said dark-stripe layer opposite said lenticular lens layer.

29. The display of claim 26 comprising:

a diffusion layer attached to said dark-stripe layer; and a hard coating applied to said diffusion layer to protect said screen.

30. The display of claim 26, wherein said shaped lens elements are orientated to optimize the brightness and viewing angle of said screen in the vertical and horizontal directions.

31. The display of claim 26, wherein said shaped lens elements axe orientated to increase the viewing angle of said screen in the horizontal direction.

32. The display of claim 26, wherein said shaped lens elements are staggered to follow the orientation of said stripes allowing said modulated light to pass through.

33. The display of claim 23, said projection engine comprising at least one crystal device.

34. The display of claim 23, said projection engine comprising at least one digital micromirror device.

35. The display of claim 23, said projection engine comprising:

a light source emitting white light;

a rotating color filter wheel filtering said white light and emitting sequential red-green-blue light; and a digital micromirror device modulating said sequential red-green-blue light.

36. The display of claim 23, said projection engine comprising:

a light source emitting white light along a light path;

an integrating rod along said light path;

a rotating color filter wheel filtering said white light and emitting sequential red-green-blue light;

a digital micromirror device modulating said sequential red-green-blue light;

a total internal reflective prism on said light path directing said sequential red-green-blue light onto and off of said digital micromirror device.

37. The display of claim 23, said dark-stripe layer comprising a plurality of dark-stripes separated by stripes allowing said modulated light to pass through said dark-stripe layer, said dark-stripes rotated 45±15 degrees relative to an edge of said screen, said display screen comprising:

a lenticular lens layer attached to said dark-stripe layer, said lenticular lens layer comprised of arrays of lenses arranged in lens array stripes corresponding to said stripes allowing said modulated light to pass through said dark-snipe layer, each lens array stripe shaped to maintain traditional brightness roll-off relative to the vertical and horizontal screen axes.

38. The method of claim 1, said providing a display screen comprising:

providing a lenticular lens layer attached to said plurality of light impeding stripe structures, said lenticular lens layer comprised of arrays of lenses arranged in lens array stripes corresponding to said light impeding stripe structures, each Ices array stripe shaped to maintain traditional brightness roll-off relative to the vertical and horizontal screen axes.

39. The rear-projection display screen of claim 3, said lenticular lens layer comprised of arrays of lenses arranged in lens array stripes corresponding to said snipes allowing said modulated light to pass through said dark-stripe layer, each lens array stripe shaped to maintain traditional brightness roll-off relative to the vertical and horizontal screen axes.

40. The display of claim 9 said display screen comprising:

a lenticular lens layer comprised of arrays of lenses arranged in lens array stripes corresponding to spaces between stripes of said dark-stripe layer, each lens array stripe shaped to maintain traditional brightness roll-off relative to the vertical and horizontal screen axes.

* * * * *

UNITED STATES PATENT AND TRADEMARK OFFICE
CERTIFICATE OF CORRECTION

PATENT NO. : 6,709,113 B2
DATED : March 23, 2004
INVENTOR(S) : Dana J. Segler, Jr. and Adam J. Kunzman It is certified that error appears in the above-identified patent and that said Letters Patent is hereby corrected as shown below:

<u>Title page,</u>
Item [75], Inventors, change "Dana J. Segler, Jr." to -- Dana F. Segler, Jr. --

Signed and Sealed this

Eighth Day of February, 2005

JON W. DUDAS
*Director of the United States Patent and Trademark Office*